Feb. 26, 1935.   R. G. DE LA MATER   1,992,912
BRAKE SYSTEM FOR DRILLING EQUIPMENT
Filed June 7, 1933    5 Sheets-Sheet 1

Feb. 26, 1935. R. G. DE LA MATER 1,992,912
BRAKE SYSTEM FOR DRILLING EQUIPMENT
Filed June 7, 1933 5 Sheets-Sheet 2

Fig. 2.

INVENTOR
Robert G. De La Mater
By Green & McCallister
His Attorneys

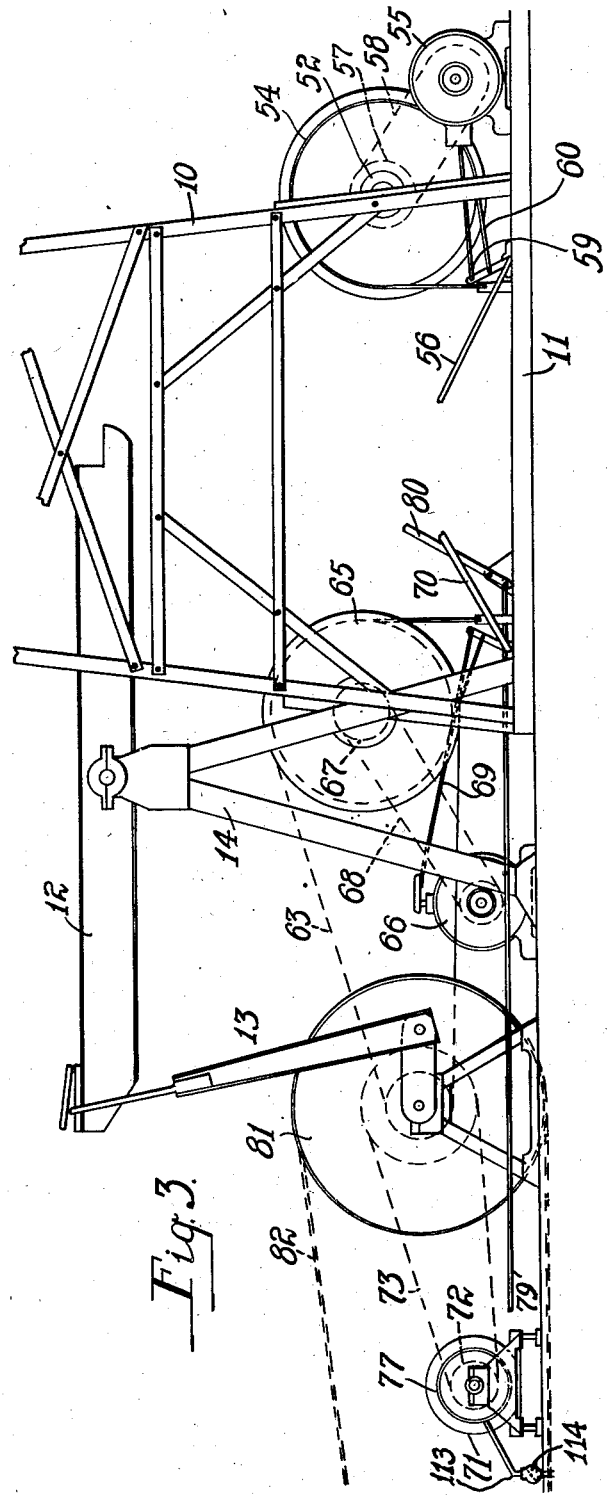

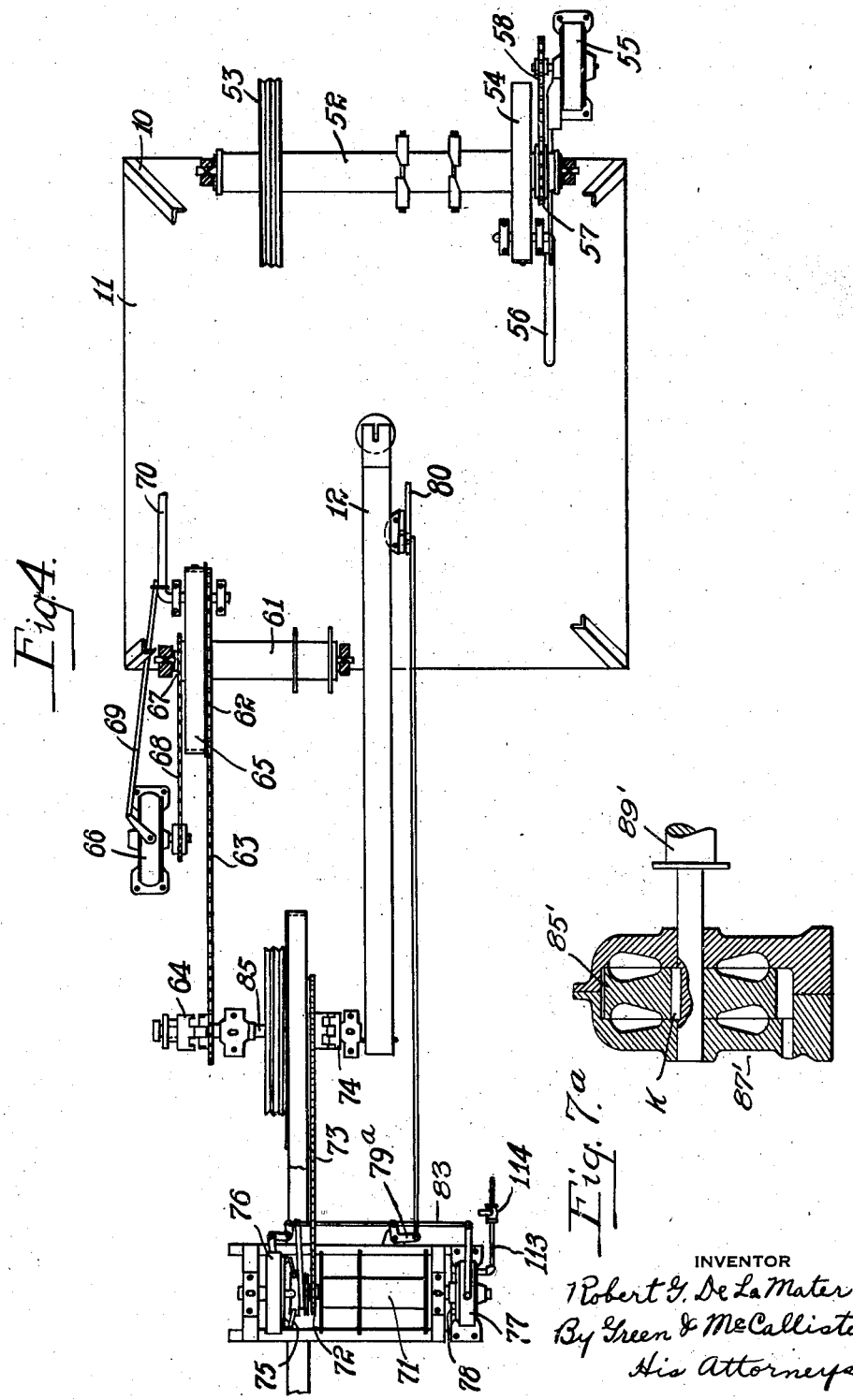

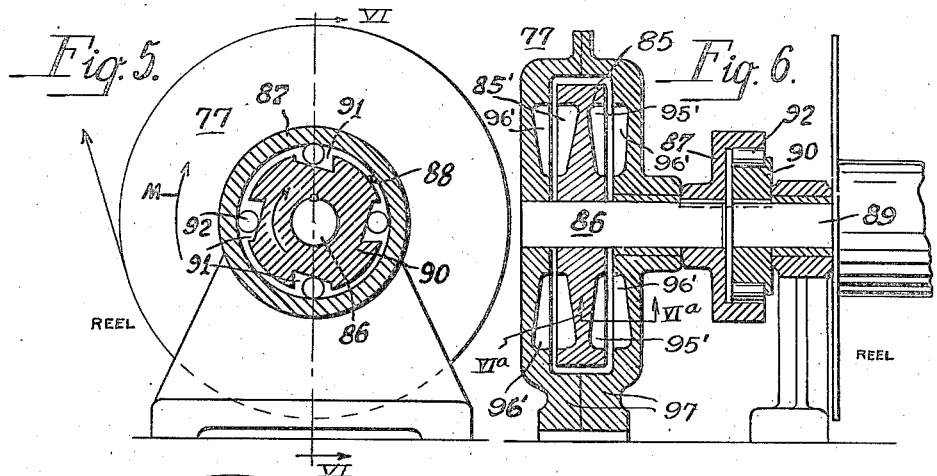

Patented Feb. 26, 1935

1,992,912

UNITED STATES PATENT OFFICE 1,992,912

BRAKE SYSTEM FOR DRILLING EQUIPMENT

Robert Griffin De La Mater, Parkersburg, W. Va., assignor to The Parkersburg Rig & Reel Company, a corporation of West Virginia Application June 7, 1933, Serial No. 674,703

6 Claims. (Cl. 188—105)

This invention relates to a brake system for hoists and more particularly to a dynamic brake system for oil or gas well drilling equipment, and is a continuation in part of my copending application, Serial No. 476,182, filed August 18, 1930.

The hoist used on a drilling rig is commonly designed so that the fall of the suspended weight is controlled only by a manually operated mechanical friction brake mounted on the reel shaft. Thus, the speed that the line and reel may attain is limited only by the judgment of the operator as to safety, and as to the capacity of the brake ultimately to stop the reel. Accidents happen, however, due to the reel attaining speeds at which failure of the rotating parts are caused by centrifugal force. With the increasing depths to which wells are now being drilled, the loads on these reels have increased in a much greater proportion. Physical limitations have prevented increasing the size of the brakes in proportion to the increased load.

In general, the drums of the bull and calf wheels are wood lagged to coact with external contracting steel bands, while the smaller sand reel and draw works drums are of steel or cast iron and the bands are lined with asbestos. With the limited braking capacity available, the metal bands or drums often reach temperatures of 800° F., or more. These temperatures greatly reduce the strength of the metal to withstand the strains placed upon it, and with the alternate heating and cooling of the parts, ultimately cause failure. As a result, frequent replacements of expensive equipment are necessary.

The principal object of my present invention is to provide a compact, safe and efficient brake which preferably expends its energy on a fluid, such as water, so that wear and deterioration of braking parts are greatly reduced.

A study of the manner in which the load is built up in well drilling operations shows that to the acceleration of gravity there must be added the ever increasing weight of the cable, or the like, which is paid out as the drums unreel. In deep drilling the operations this weight is large, and the load increases at a rate faster than the speed. It is an important object of my invention to employ a brake, the characteristics of which are substantially the same as those of the load, so that it can take care of the increasing weight of cable as well as its speed due to gravity and automatically negotiate the lowering of the load and the control of the speed of the reel and load. This result can be accomplished by coupling the load to a part which rotates in a fluid in such a way that the constant moving of the weight of the fluid from one part of the brake to the other offers sufficient resistance to check the load, the characteristics of the increasing resistance closely paralleling those of the load.

It is a further object of my invention to provide a brake which offers a sufficient checking resistance to automatically negotiate the safe operation of the hoist or drill rig when the load is falling, but which offers little or no resistance to the load when the latter is being raised. This result can be accomplished either by an automatically locking and unlocking clutch between the load and brake, or by designing the brake so that rotation in one direction offers much more resistance than in the opposite direction.

It is a still further object of my invention to provide a brake system wherein a fluid friction brake absorbs the greater part of the energy developed by the descending load, the difference between the energy developed and that absorbed by the brake being small enough to be handled easily and efficiently by a hand brake. I have found that the mechanical friction brake is effective for varying speeds of the reels because of the fact that the resistance of the fluid friction brake follows closely the requirements of the load, and the difference remains more or less constant regardless of speed.

Other and further objects and advantages will be understood by those skilled in this particular art.

In the accompanying drawings, where my invention is illustrated in different forms, Figure 1 is a more or less diagrammatic schematic view in side elevation of a hoist provided with one form of my invention;

Fig. 2 is a plan view of Fig. 1;

Fig. 3 is a view similar to Fig. 1 showing a modified form of the invention;

Fig. 4 is a plan view of Fig. 3;

Fig. 5 shows an end view of a dynamic brake with a ratchet coupling adapted for axial mounting with respect to a reel, parts being in section;

Fig. 6 shows a cross-section through an assembly of Fig. 5 on line VI—VI, Fig. 5, together with a reel;

Fig. 6a is a fragmentary half section view, taken on a line indicated at VIa—VIa Fig. 6, of a fluid friction brake designed to develop equal braking effort in either direction of operation;

Fig. 6b is a fragmentary half section view taken in the same relative position as Fig. 6a, of a fluid friction brake designed to develop high braking effort in one direction of operation and negligible braking effort in the opposite direction;

Fig. 7 shows a chain drive instead of the axial drive of Fig. 6;

Fig. 7a is a view showing a direct connection between the hoist shaft and a dynamic fluid friction brake;

Fig. 8 shows schematically how the mechanical brake and clutch are linked with the dynamic brake, and Fig. 9 is a graph of the load characteristics of a hoist and the dynamic brake forming part of my invention.

Figure 1:
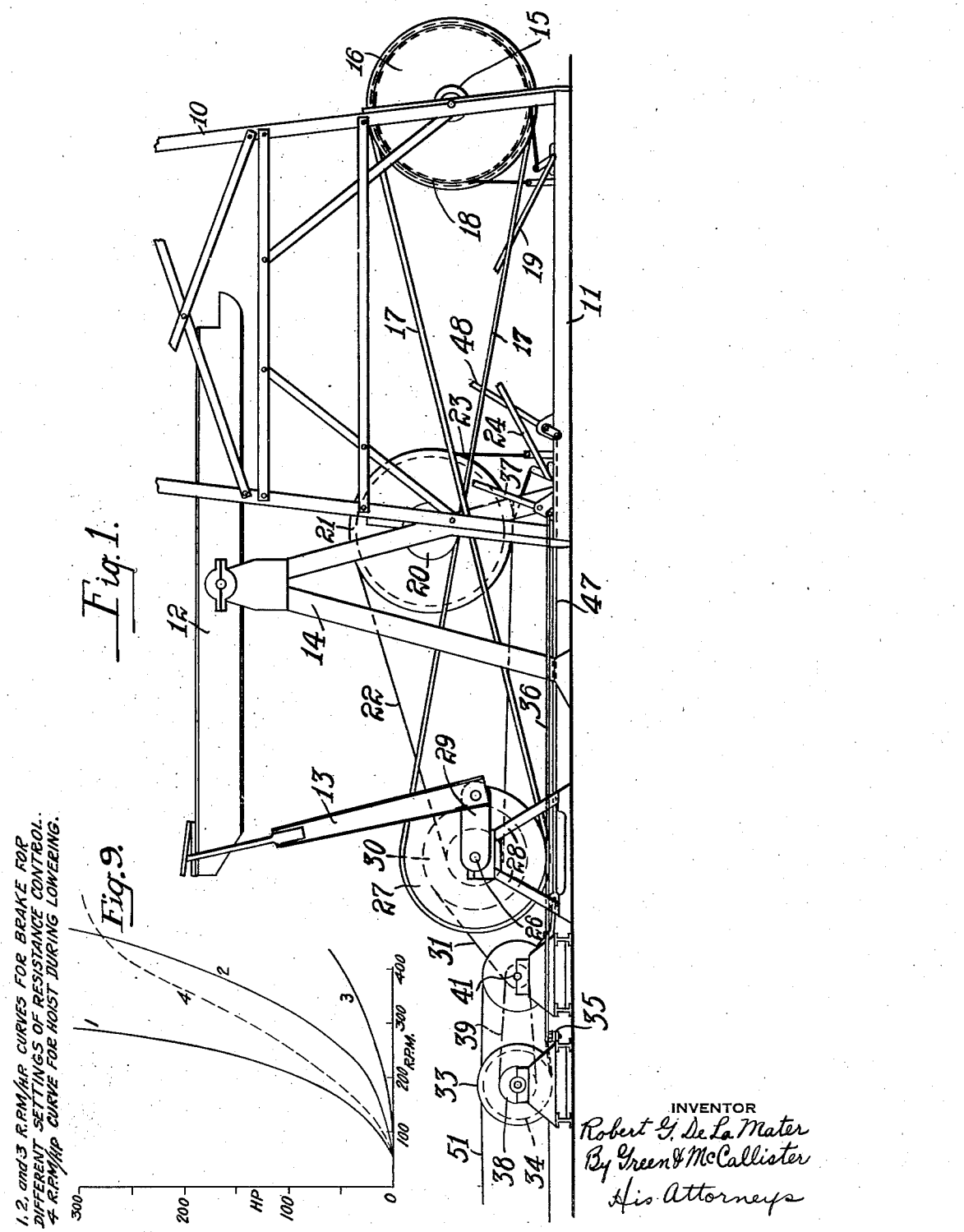

A hoist for well drilling usually employs several drums or reels for the different types of work to be done. In carrying out my invention, I may provide a single dynamic brake coupled to all the reels through a drive and braking shaft common to the reels, or I may use a separate brake for each reel. Furthermore, the dynamic brake may be coupled to the reel by permanent connections, so as to rotate with the latter in both directions, or it may be connected when the reel is rotating to lower a load but be disconnected when the load is being raised. When permanently connected, the brake is designed to offer more resistance when rotating in one direction than in the other. Each of these features will be set forth in detail hereinafter.

The preferred form of the invention is shown in Figs. 1 and 2, where the derrick 10, floor 11, walking beam 12, pitman 13 and Samson post 14 are of usual form. The bull wheel 15 for raising and lowering tools has a tug pulley 16 for the tug ropes 17, and is provided with a mechanical friction brake 18 having a handle 19. The usual calf wheel 20 for raising and lowering casing has a sprocket 21 meshing with a chain 22. A mechanical friction brake 23 and handle 24 therefor are provided for the calf wheel. Crank shaft 26 is provided with a tug pulley 27, while jack post 28 supports crank 29 which is connected to pitman 13. A sprocket 30 and drive chain 31 move with crank shaft 26 and jaw clutch 32 is adapted to connect chain 31 to a driving element as will appear hereinafter.

Sand reel 33 is used in raising and lowering bailers and has associated therewith a mechanical friction brake 34 having brake lever 35, reach rod 36 and hand lever 37. The sprocket 38 and drive chain 39 are provided for the sand reel similarly to the wheels above mentioned, and the jaw clutch 40 functions as will be hereinafter described. Countershaft 41 supported in framework 42 has loose thereon a pulley 43 driven by motor 50 and belt 51, and secured thereto a driving friction clutch 44. These parts may be of usual construction.

In carrying out this form of my invention, I provide for the several reels a single hydraulic fluid friction brake or dynamic fluid friction brake 45 mounted axially of countershaft 41. The hydraulic brake 45 and drive clutch 44 are connected by linkage including a combination angle lever 46 having a reach rod 47 and hand lever 48. Auxiliary link 49 shown in dotted lines in Fig. 2 may be used to interconnect brake 34 with the members just mentioned.

The rotor R of the dynamic brake 45 is keyed to the countershaft 41 and revolves with it. Each of the units of the rig will be driven from and checked through connection with this countershaft.

The engaging mechanism 46 of the friction clutch 44 is linked to the resistance control of the dynamic brake 45 so that these two controls are interlocking and actuated by the single reach rod 47 and hand lever 48 on the derrick floor. This interlocking control is one feature of this invention.

In raising tools, the tug ropes 17 are placed on the tug pulleys 16 and 27, the drilling line passing up over the crown block (not shown) of the derrick and down to the bull wheel. Jaw clutch 32 fast on shaft 41 is coupled to chain 31, clutches 40 and 25 are disengaged, and the pitman 13 is removed from the wrist pin. The tools are then raised by moving drive friction clutch 44 also fast on shaft 41, against drive member 43 by means of the hand lever 48. In lowering the tools, the drive clutch 44 is disengaged and the resistance of the dynamic brake applied by the hand lever 48. The mechanical friction "prony" brake 18 on the bull wheel shaft may be operated in conjunction with the dynamic brake to control the speed of descent, but this hand brake is used primarily to finally stop the reel and hold the suspended weight stationary because the fluid friction brake is alone sufficient to automatically negotiate the safe operation of the hoist when the load is lowered. The terms negotiate or negotiating are employed herein to denote that the fluid friction brake will automatically control the operation of the hoist or drill rig in such fashion that the load may accelerate to speed rapidly and then be checked at a safe predetermined maximum high speed, and allow the load to descend at such speed until the load has reached its destination or until such time as it is desirable or necessary to proceed at a lower speed. The reduced speed may be attained by applying the mechanical friction or "prony" brake. It will be observed that the interlocking control of drive clutch and dynamic brake gives a flexibility of control, provides a safety feature, and eliminates a multiplicity of hand levers.

In raising or lowering casing the calf wheel 20, jaw clutches 32 and 25 are engaged and the reel is controlled by the hand levers 48 and 24 in the same manner as in the case of the bull wheel.

In bailing operations, with the sand reel, the jaw clutch 40 fast on shaft 41 is the only one that would be engaged, and the reel would be controlled by the hand lever 48 previously described and the "prony" brake 37.

A further development of the interlocking control of brake and drive clutch is illustrated by the introduction of the additional link 49 on the sand reel brake. In this application see Fig. 8, motion of the hand lever 48 in one direction engages the drive clutch and disengages dynamic brake 45 and the mechanical friction brake 34 on the sand reel. Partial motion of the hand lever 48 beyond neutral in the opposite direction applies resistance to the dynamic brake and further motion takes up the normal slack in the mechanical brake linkage and the slack distance between the band and drum, and applies the mechanical brake for finally stopping or holding the load. In this case the hand lever 27 would be used only for locking the mechanical brake when the reel is not in use, in case of emergency.

In the type of hydraulic dynamic brake, already described, resistance is built up in the brake by rotation in one direction only, and the brake can therefore be keyed directly to the countershaft. It is apparent that the countershaft will always revolve in one direction when driving any of the units and in the opposite direction when braking.

Figs. 3 and 4 represent a modified application of the brakes wherein each hoist has its own individual dynamic brake. Bull wheel 52 has a tug pulley 53, and a mechanical friction brake 54. In this instance, the dynamic brake 55 is mounted separately from the reel it is to check, and is coupled to the bull wheel 58 and sprocket 57 on wheel 52. A hand lever interlocking control 56 operates both brakes through linkages 59 and 60, the sequence of operations being indicated in Fig. 8, which shows that the friction brake is not applied until just before the load is to be brought to rest.

Calf wheel 61 has a drive sprocket 62 and drive chain 63 for connecting the same to drive jaw clutch 64, and the mechanical friction brake is indicated at 65. The dynamic brake 66 is connected by means of drive chain sprocket 67 and drive chain 68 to the calf wheel, and a reach rod 69 and hand lever 70 are provided to control the brakes analogously to bull wheel 52.

The sand reel 71 has a sand reel drive sprocket 72, and drive chain 73. The sand reel drive jaw clutch 74, drive friction clutch 75, and brake 76, are provided as shown. In this instance the dynamic brake 77 is mounted axially of the reel shaft, and a drive coupling 78, connects the brake 77 to the sand reel. This coupling may be of the ratchet type to operate when turning in one direction only. The interlocking control of the friction clutch, mechanical brake, and dynamic brake, may be effected by connections 79, 79a and 83 and the lever 80 provided therefor. A drive pulley 81 and drive belt 82 are provided to turn countershaft 85 when loads are being lifted.

In this second form of the invention each reel has its own fluid friction brake, and in addition, brake 77 is coaxial with its reel. In this latter instance, as seen in Figs. 5 and 6, the brake 77 has a rotor 85 on a shaft 86 to which is keyed a sleeve 87 having a cylindrical interior locking surface 88. The shaft 89 of the reel 71 has keyed thereon a ratchet element 90 provided in its periphery with pockets 91 having bottoms inclined as shown in Fig. 5. Lock rolls 92 are located in the pockets, and are of such a diameter as to lock together the parts 87 and 90 when the reel turns in the direction of arrow M, Fig. 5, to lower a load. When the load is raised, however, the parts rotate in the opposite direction and the rolls occupy the wider part of the pockets, thus uncoupling the brake and reel.

In addition to the advantages already mentioned for the releasable coupling, it may be noted that a heavy rotor is free to turn independently of the reel when the latter has been checked by the hand brake. The operator need not overcome the momentum, therefore, of the rotor when bringing the load to rest.

Fig. 7 shows a connection between the brake and reel similar to that set forth in Fig. 5, the rotor sprocket 98 engaging chain 58 which is trained over sprocket 99 rotatable about a shaft 100 coaxial with the bull wheel. A ratchet member 101 and rolls 102 coact with the sprocket 99 to couple the dynamic brake 55 to the bull wheel in a manner similar to the connection shown in Fig. 5.

In the type of dynamic brake shown in Fig. 6a, high resistance may be built up by rotation of the rotor in either direction. This feature of the brake grows out of the fact that the rotor pockets 95' and stator pockets 96' of the stationary part, or stator 97 are shaped (see Fig. 6a) to interact equally to resist motion to the rotor regardless of the direction of rotation. This type of brake may have the rotor positively driven in either direction, or it may be used with the releasable coupling in which case the rotor would assist in effecting the release of the rotor from the shaft.

In Fig. 7a, the rotor 85' of a fluid friction brake 77' is shown as being rigidly connected as by means of a key K to a hoist reel shaft 89'. Thus the brake rotor will revolve with the reel shaft and in the same direction.

In some types of dynamic brakes, the speed-load characteristics are such that if it were positively driven in either direction from a hoist or countershaft, the low speed at which these units revolve when being driven from the driving unit when loads are being raised would cause no appreciable resistance in the brake. Such a brake may be keyed or otherwise positively driven in both directions from the unit it serves, since no braking would occur except at the higher speeds. Where a more rapid raising of the tools, etc., is desired, the rotor and stator pockets 95, 96, respectively (see Fig. 6b) are shaped to throw the fluid within the brake in such directions that high resistance is offered to rotation in one direction, while a much reduced resistance is offered in the other direction.

A study of the speed load characteristics of a hoist such as used in well drilling shows that the energy developed which must be dissipated by the brake varies approximately as the square of the rate of descent. I have found that fluid friction brakes lend themselves to such design as will develop resistance proportional approximately to the square of their rate of rotation, so that their resistance corresponds closely to the effort required to check the load. Fig. 9 shows graphically the speed load characteristics of such a brake. The speed-load curve of a hoist is shown at the dotted line 4, while the solid line curves 1, 2, and 3 represent the behavior of the brake for different settings of the resistance control afforded by valves 110 and 114. It will be noted that curves 1 and 2 follow approximately the curve 4, so that a setting of the control between those which resulted in lines 1 and 2 would produce a curve almost exactly the same as 4. A setting of the resistance control may be determined that would provide automatic or semi-automatic speed control and power absorption when the load is lowered.

The interconnecting control between the dynamic brake and the hand levers can be arranged as shown in Fig. 8. The resistance offered by the hydraulic brake depends upon the amount of water in it, and this fact is used to effect the control. A valve 110 connects with a pipe 111 which supplies water from a source not shown but set forth in copending application Serial No. 476,182, of which this is a continuation in part. Pipe 112 leads from the valve to the interior of the fluid friction brake, while another pipe 113 with a pet cock 114, see Fig. 4, drains water from the brake. When the valve 110 is closed as in Fig. 8 the fluid will run out of the brake, the pet cock being set to allow a slow egress. When the valve is thrown, however, so that its port 115 connects pipes 111 and 112, water flows into the brake faster than it drains out, and builds up resistance in the brake. On the other hand, when the valve is returned to the closed position, the water flows out of pipe 113 and the brake thereafter has no checking action until supplied with water again. It is not necessary to have the interconnected control just described for all of the reels, nor where the clutch connection is used. A cooling system for the water may be employed if desired, such as shown in the aforementioned application.

From the foregoing it will be seen that I have provided a simple form of brake for hoists and the like, such as well drilling rigs, wherein a fluid friction dynamic brake is connected to the load in such a way as to check the latter by the churning of the fluid in the brake. Furthermore, a brake is used which has the same general characteristics as the load to be checked, so that the brake is effective for different speeds. Also, the brake is so arranged that it does not offer any substantial resistance to the raising of the load. This result may be accomplished either by proper design of the interior of the brake, or by using a ratchet type clutch as described in connection with Figs. 5, 6, 6a, 6b and 7. The fluid friction brake will absorb most of the energy of the descending load, so that the hand brake is required to take care of a small part only of the load. It will further be seen that the interconnected linkage permits the operator to control the dynamic brake as well as the mechanical brake and driving clutch from the same lever.

Having thus described my invention, it will be apparent that changes and modifications may be made therein by those skilled in the art without departing either from the spirit or the scope of the invention. It is desired therefore that only such limitations shall be placed on the invention as are imposed by the prior art and the appended claims.

What I claim as new and desire to secure by Letters Patent is:

1. In a brake system for hoists, a fluid friction brake connected to the hoist, a mechanical friction brake for the hoist, a control to vary the braking action of the first named brake, and a single means to actuate the mechanical brake and control.

2. In a brake system for a hoist, a reel from which the load is suspended, a fluid friction dynamic brake coupled to the reel, a control to vary the resistance offered by the brake to the load, a hand brake for the reel, and a single means to actuate the control and hand brake.

3. In a brake system for a hoist, a reel to which the load is attached, a fluid friction dynamic brake connected to the reel to check descent of the load, a control for the brake to vary the amount by which the brake checks the load, a drive to cause the reel to lift the load, and a single means to actuate the control and drive.

4. In a brake system for a hoist, a reel connected to the hoist, a fluid friction brake connected to the reel to check descent of the load of the hoist, a control for the brake to vary the checking action thereof on the reel, a mechanical brake to stop the reel, a drive to move the reel to lift the load, and a single means to actuate the control, mechanical brake and drive.

5. In a draw works, the combination with a winding drum having a brake flange, and a manually operable brake for controlling the unwinding movement of the drum, power operated means for rotating the drum, clutch means for connecting the power operated means to the drum or disconnecting it therefrom, an hydraulic brake automatically operated to resist the rotation of the drum when the drum is disconnected from the power operated means and is rotating in a direction opposite thereto, and clutch means between said hydraulic brake and said winding drum.

6. In a draw works, the combination with a winding drum having a brake flange, and a manually operable brake for controlling the unwinding movement of the drum, power operated means for rotating the drum, clutch means for connecting the power operated means to the drum or disconnecting it therefrom, an hydraulic brake automatically operated to resist the rotation of the drum when the drum is disconnected from the power operated means and is rotating in a direction opposite thereto, and a clutch between the hydraulic brake and the winding drum for disconnecting the one from the other when the power operated means is connected to the winding drum and connecting the same in driving relation when the power operated means is disconnected from the winding drum.

ROBERT GRIFFIN DE LA MATER.